(12) United States Patent
Ogawa et al.

(10) Patent No.: US 11,563,367 B2
(45) Date of Patent: Jan. 24, 2023

(54) POWER CONVERSION SYSTEM

(71) Applicant: MEIDENSHA CORPORATION, Tokyo (JP)

(72) Inventors: Ryuichi Ogawa, Numazu (JP); Masashi Takiguchi, Fuji (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/771,629

(22) PCT Filed: Aug. 18, 2020

(86) PCT No.: PCT/JP2020/031082
§ 371 (c)(1),
(2) Date: Apr. 25, 2022

(87) PCT Pub. No.: WO2021/084847
PCT Pub. Date: May 6, 2021

(65) Prior Publication Data
US 2022/0352805 A1 Nov. 3, 2022

(30) Foreign Application Priority Data

Oct. 30, 2019 (JP) .............................. JP2019-196876

(51) Int. Cl.
*H02M 1/00* (2006.01)
*H02M 5/42* (2006.01)
(Continued)

(52) U.S. Cl.
CPC ........... *H02M 1/0012* (2021.05); *H02M 5/42* (2013.01); *H02M 7/5387* (2013.01); *H02P 1/24* (2013.01); *H02P 25/18* (2013.01); *H02P 27/085* (2013.01)

(58) Field of Classification Search
CPC .................................................. H02M 1/0012
See application file for complete search history.

(56) References Cited

U.S. PATENT DOCUMENTS

| 4,870,684 A | * | 9/1989 | Arai | ...................... | H03L 7/0992 |
| | | | | | 331/25 |
| 5,491,393 A | * | 2/1996 | Uesugi | ...................... | H02P 6/34 |
| | | | | | 318/807 |

(Continued)

FOREIGN PATENT DOCUMENTS

| JP | 2012-210066 A | 10/2012 |
| JP | 2014-143831 A | 8/2014 |

(Continued)

*Primary Examiner* — Yusef A Ahmed
(74) *Attorney, Agent, or Firm* — Foley & Lardner LLP

(57) ABSTRACT

In a power conversion system having a fixed pulse pattern modulation unit 2 that is configured to refer to tables storing therein pulse patterns that determine respective command voltage levels corresponding to phase information for each modulation ratio and to generate a gate signal g on the basis of a command modulation ratio d and a control phase θ and driving a power converter 3 on the basis of the gate signal g, the fixed pulse pattern modulation unit 2 is further configured to, when performing a pulse pattern transition, search for a proper post-transition table reference position and make a command voltage level follow a command voltage level of a post-transition pulse pattern. With this, the power conversion system that can perform the pulse pattern transition without current impulse and that can also be applied to a multi-level power converter having four levels or more can be provided.

9 Claims, 8 Drawing Sheets

(51) Int. Cl.
  *H02P 1/24* (2006.01)
  *H02M 7/5387* (2007.01)
  *H02P 27/08* (2006.01)
  *H02P 25/18* (2006.01)

(56) References Cited

U.S. PATENT DOCUMENTS

| | | | |
|---|---|---|---|
| 6,397,611 B1* | 6/2002 | Yamato | H02P 6/04 62/298 |
| 10,236,818 B2* | 3/2019 | Tada | H02P 27/08 |
| 10,461,681 B2* | 10/2019 | Irie | H02P 27/08 |
| 10,879,816 B2* | 12/2020 | Irie | H02P 21/22 |
| 11,152,884 B2* | 10/2021 | Yamamoto | H02M 1/12 |
| 2002/0140395 A1* | 10/2002 | Tazawa | H02P 6/182 318/727 |
| 2009/0129132 A1* | 5/2009 | Furutani | H02M 7/4807 363/95 |
| 2010/0134053 A1* | 6/2010 | Yamada | H02P 27/08 318/162 |
| 2010/0176757 A1* | 7/2010 | Yamakawa | H02M 7/53873 318/400.09 |
| 2011/0043149 A1* | 2/2011 | Kitanaka | H02P 27/04 318/400.26 |
| 2011/0175558 A1* | 7/2011 | Kitanaka | H02P 21/22 318/400.3 |
| 2011/0193509 A1* | 8/2011 | Ooyama | H02M 1/12 363/40 |
| 2011/0266992 A1* | 11/2011 | Nishiguchi | H02P 27/08 318/807 |
| 2011/0273125 A1* | 11/2011 | Yamada | H02P 27/085 318/503 |
| 2013/0033205 A1* | 2/2013 | Furukawa | H02P 21/0003 363/131 |
| 2014/0361720 A1* | 12/2014 | Miyachi | H02P 6/16 318/400.39 |
| 2015/0015171 A1* | 1/2015 | Nishibata | H02P 21/14 318/400.15 |
| 2015/0333681 A1* | 11/2015 | Matsuki | H02P 21/0085 318/400.02 |
| 2016/0301336 A1* | 10/2016 | Nishibata | H02P 6/16 |
| 2017/0294862 A1* | 10/2017 | Takahashi | H02M 1/44 |
| 2017/0294863 A1* | 10/2017 | Takahashi | H02P 21/20 |
| 2017/0294864 A1* | 10/2017 | Tada | H02P 25/22 |
| 2017/0033141 A1 | 11/2017 | Kondo | |
| 2017/0331410 A1* | 11/2017 | Kondo | H02P 21/26 |
| 2018/0062542 A1* | 3/2018 | Sakakibara | H02M 7/219 |
| 2018/0091061 A1* | 3/2018 | Sakakibara | H02M 7/5395 |
| 2018/0358911 A1* | 12/2018 | Kojima | H02P 6/20 |
| 2019/0074791 A1* | 3/2019 | Irie | H02M 7/5395 |
| 2019/0089266 A1* | 3/2019 | Iwazaki | H02M 5/458 |
| 2019/0229664 A1* | 7/2019 | Kobayashi | H02P 21/141 |
| 2019/0229665 A1* | 7/2019 | Kobayashi | H02P 21/141 |
| 2019/0238063 A1* | 8/2019 | Irie | H02M 7/539 |
| 2019/0256128 A1* | 8/2019 | Takase | H02M 7/48 |
| 2019/0375449 A1* | 12/2019 | Takase | H02P 29/66 |
| 2020/0130730 A1* | 4/2020 | Takase | H02P 21/0003 |
| 2020/0382021 A1* | 12/2020 | Yamane | H02P 27/06 |
| 2021/0083597 A1* | 3/2021 | Hayashi | H02P 27/14 |

FOREIGN PATENT DOCUMENTS

| | | |
|---|---|---|
| JP | 2017-204918 A | 11/2017 |
| JP | 6270696 | 1/2018 |
| JP | 2019-180181 A | 10/2019 |
| WO | WO 2016/059684 A1 | 4/2016 |

* cited by examiner

POWER CONVERSION SYSTEM

TECHNICAL FIELD

The present invention relates to a power conversion system that generates a gate signal by referring to a table storing therein information of pulse pattern and drives a power converter by the gate signal.

BACKGROUND ART

Consider a power conversion system in which an input three-phase AC voltage is converted into a DC voltage by a rectifier (an AC/DC converter) and the DC voltage is output as an AC voltage having a desired frequency and a desired amplitude by an inverter.

In such a power conversion system, a triangular-wave comparison PWM that expresses a target voltage on average in one cycle of a carrier is often used for an output of a power converter. However, there is a case where a modulation method other than the triangular-wave comparison PWM is used for the purpose of optimizing a voltage output, and a fixed pulse pattern method is an example of the modulation method. In this fixed pulse pattern method, an optimum pulse pattern for evaluation indexes is derived and converted into a table (or tabulated) in advance, and switching is performed according to the table.

In the fixed pulse pattern method, one form of a pulse pattern can express only a single modulation ratio. Because of this, if operation is performed using a plurality of modulation ratios, it is necessary to switch the pulse pattern during operation. At the time of a transition of the pulse pattern, an output voltage may become an unintended waveform, then there is a risk that a current impulse will occur. Therefore, its transition method has to be devised. In the following description, this pulse pattern transition during operation is also simply referred to as the transition.

The pulse pattern transition method in the fixed pulse pattern method is disclosed in the following Patent Documents 1 and 2.

In Patent Document 1, a voltage phase in which switching is not performed at the time of the transition for a two-level inverter is searched for in advance, and the pulse pattern is switched in the phase in which the switching does not occur.

In Patent Document 2, in a case of a transition in which the number of pulses in one fundamental wave cycle is switched for a three-level power converter, a minimum pulse is set so that an error of a fundamental wave voltage does not occur, and by gradually increasing the minimum pulse in each one fundamental wave cycle, increase in the number of pulses is performed without an impulse. As for a transition in which the number of pulses is decreased, on the contrary, by gradually reducing and finally eliminating the pulse, the impulse is eliminated.

Patent Documents 1 and 2 cannot solve problems when the fixed pulse pattern method is applied in the power converter having four levels or more.

The problems of Patent Document 1 will be described. In a multi-level power converter having four levels or more, there is a possibility that at the time of the pulse pattern transition in which the number of levels used is changed, a voltage phase that uses the same level before and after the transition may not exist. In this case, there arises a problem of not being able to perform transition of the pulse pattern.

Further, in a case where there is a difference in third-order harmonic component in each pulse pattern, an impulse caused by sudden switching of the third-order harmonic component may occur. However, in Patent Document 1, its control is a control that changes the pulse pattern regardless of the voltage phase if switching does not occur before and after the transition, and thus Patent Document 1 does not consider this impulse.

The problems of Patent Document 2 will be described. In a multi-level power converter having four levels or more, it is generally undefined at which level the increase or decrease in the number of pulses occurs. Also, it is generally undefined in which voltage phase range a level of the increase or decrease of the pulse exists. For these reasons, an appropriate generation position of the minimum pulse cannot be determined.

Further, in the fixed pulse pattern, mainly due to the difference in third-order harmonic component, a switching phase may considerably change even if the number of pulses is the same. In this transition, only one or two phases may be shifted immediately (only transition of one or two phases may be performed), and the other phase may follow a waveform after the transition with a delay. However, Patent Document 2 does not discuss an appropriate transition method other than a case where the number of pulses is changed.

From the above, a task is to provide a power conversion system that is capable of performing the pulse pattern transition without the current impulse (current impact or shock) and that can also be applied to the multi-level power converter having four levels or more.

CITATION LIST

Patent Document

Patent Document 1: Japanese Unexamined Patent Application Publication No. 2017-204918
Patent Document 2: Japanese Patent No. 6270696

SUMMARY OF THE INVENTION

The present invention was devised in view of the above conventional problems. As one aspect of the present invention, a power conversion system has a fixed pulse pattern modulation unit that is configured to refer to tables storing therein pulse patterns that determine respective command voltage levels corresponding to phase information for each modulation ratio and to generate a gate signal on the basis of a command modulation ratio and a control phase, and drives a power converter on the basis of the gate signal, and the fixed pulse pattern modulation unit is further configured to, when performing a pulse pattern transition, search for a proper post-transition table reference position and make a command voltage level follow a command voltage level of a post-transition pulse pattern.

As one aspect of the present invention, the fixed pulse pattern modulation unit has: a transition index search unit configured to output a transition table index on the basis of the command modulation ratio; a transition switch configured to input the transition table index and a table index previous value and output, as a table index, the transition table index in a case of presence of the transition and the table index previous value in a case of absence of the transition; a table comparison unit configured to perform a table comparison on the basis of the table index and the control phase and output the gate signal; and a buffer configured to delay the table index by one control period and output the delayed table index as the table index previous value.

Further, as one aspect of the present invention, the table comparison unit has, as the tables, phase information in which a level changes for each modulation ratio and command voltage level information after the level change, and the table comparison unit is configured to read a table value on the basis of the table index, compare the control phase and the phase information of the table, if the control phase is greater than the phase information of the table, update the command voltage level and increment a reference position of the phase information of the table by one, if the control phase is equal to or less than the phase information of the table, hold the command voltage level and the reference position of the phase information of the table as previous values, generate the gate signal so as to have a same output voltage level as the command voltage level, and output the gate signal and the table index.

Furthermore, as one aspect of the present invention, the transition index search unit is configured to search for a pulse pattern of a modulation ratio closest to the command modulation ratio and set this modulation ratio as a modulation ratio index, for each phase, set, as a phase index, phase information that is one smaller than a smallest of the phase information of the table which is greater than a transition-time phase, and output the transition table index in which the modulation ratio index and the phase index of each phase are summarized.

As another aspect of the present invention, transition timing of the pulse pattern is each vicinity of 0 rad, $\pi/3$ rad, $2\pi/3$ rad, $\pi$ rad, $4\pi/3$ rad and $5\pi/3$ rad of the control phase.

As one aspect of the present invention, the fixed pulse pattern modulation unit has: a transition index search unit configured to output a transition table index on the basis of the command modulation ratio; a transition judgment unit configured to output a transition judgment result on the basis of the control phase and a control phase previous value; a transition switch configured to input the transition table index and a table index previous value and output, as a table index, the transition table index in a case of presence of the transition by the transition judgment result and the table index previous value in a case of absence of the transition by the transition judgment result; a table comparison unit configured to perform a table comparison on the basis of the table index and the control phase and output the gate signal; and a buffer configured to delay the table index by one control period and output the delayed table index as the table index previous value.

As one aspect of the present invention, the table comparison unit has, as the tables, phase information in which a level changes for each modulation ratio and command voltage level information after the level change, and the table comparison unit is configured to read a table value on the basis of the table index, compare the control phase and the phase information of the table, if the control phase is greater than the phase information of the table, update the command voltage level and increment a reference position of the phase information of the table by one, if the control phase is equal to or less than the phase information of the table, hold the command voltage level and the reference position of the phase information of the table as previous values, generate the gate signal so as to have a same output voltage level as the command voltage level, and output the gate signal and the table index.

Further, as one aspect of the present invention, the transition index search unit is configured to search for a pulse pattern of a modulation ratio closest to the command modulation ratio and set this modulation ratio as a modulation ratio index, for each phase, set, as a phase index, phase information that is one smaller than a smallest of the phase information of the table which is greater than a transition-time phase, and output the transition table index in which the modulation ratio index and the phase index of each phase are summarized.

The transition judgment unit is configured to judge whether an absolute value of a difference between the control phase and the control phase previous value is greater than $\pi$ rad, if the absolute value of the difference is greater than $\pi$ rad, set the transition judgment result as presence of the transition, if the absolute value of the difference is equal to or less than $\pi$ rad, select a transition candidate for a transition-time phase of a certain phase from $\pi/3$ rad, $2\pi/3$ rad, $\pi$ rad, $4\pi/3$ rad and $5\pi/3$, judge whether (the control phase−the transition candidate)*(the control phase previous value−the transition candidate) is smaller than 0, if (the control phase−the transition candidate)*(the control phase previous value−the transition candidate) is smaller than 0 in any one of the transition candidates, set the transition judgment result as presence of the transition, if (the control phase−the transition candidate)*(the control phase previous value−the transition candidate) is equal to or greater than 0 in all the transition candidates, set the transition judgment result as absence of the transition.

Furthermore, as one aspect of the present invention, the power converter is a multi-level power converter having four levels or more.

According to the present invention, it is possible to provide the power conversion system that is capable of performing the pulse pattern transition without the current impulse (the current impact or shock) and that can also be applied to the multi-level power converter having four levels or more.

EMBODIMENTS FOR CARRYING OUT THE INVENTION

In the following description, embodiments 1 and 2 of a power conversion system according to the present invention will be described in detail with reference to FIGS. 1 to 14.

Embodiment 1

Figure 1:
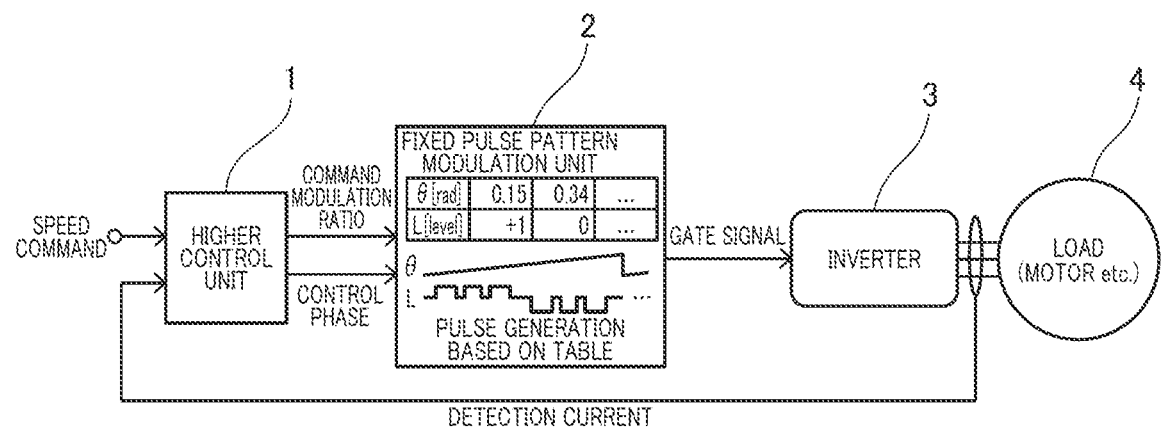
FIG. 1 is a schematic diagram showing a power conversion system according to embodiments 1 and 2.

FIG. 1 illustrates a system block diagram of an embodiment 1. A higher control unit 1 indicates a control existing upstream of a fixed pulse pattern modulation unit 2. For instance, a speed command based on a control panel operation amount and a three-phase detection current are input to a power conversion system, and a command modulation ratio and a command of a control phase are generated through speed control and current control.

After the command modulation ratio and the control phase are output from the higher control unit 1, pulse modulation is performed on the basis of these information by the fixed pulse pattern modulation unit 2. The fixed pulse pattern modulation unit 2 generates pulses by referring to a table (s) and comparing the control phase with a table value(s).

Information of pulse pattern produced in advance is stored in the table to be used, and a command voltage level corresponding to phase information is determined for each modulation ratio. A gate signal is output from the fixed pulse pattern modulation unit 2, and an inverter (a power converter) 3 is driven by this gate signal. The inverter 3 is connected to a load 4 such as a motor, and a voltage corresponding to the gate signal is applied to the load 4.

FIG. 1 is an example of a typical system configuration of power conversion by a fixed pulse pattern method, but an application target of the present embodiment 1 is not limited to this system configuration. For instance, it could be a system in which, in converter control that performs regeneration to a power supply, switching is performed on the basis of the pulse pattern table derived in advance, a system in which a motor phase is detected and used for the control, or a system of a single phase. The important thing is to drive the power converter using the table of the pulse pattern produced in advance.

Figure 2:
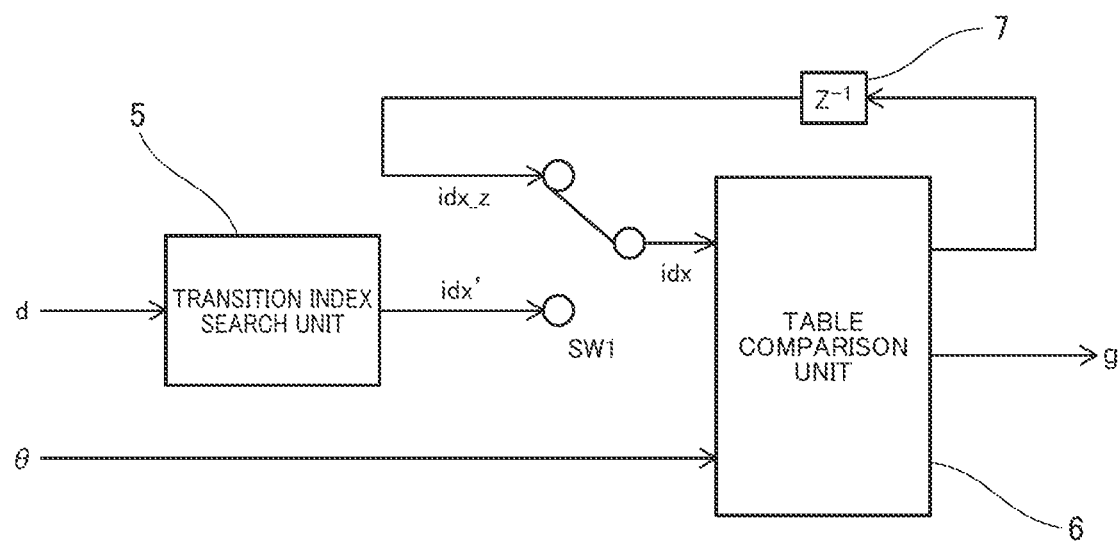
FIG. 2 is a block diagram showing a fixed pulse pattern modulation unit according to the embodiment 1.

FIG. 2 illustrates a block diagram of the fixed pulse pattern modulation unit 2 according to the embodiment 1. A transition index search unit 5 inputs a command modulation ratio d, and outputs a transition table index idx'.

A transition switch SW1 inputs the transition table index idx' and a table index previous value idx_z that is a previous output of a table comparison unit 6, and outputs the transition table index idx' if there is a transition (presence of a transition) by a transition judgment and the table index previous value idx_z if there is no transition (absence of the transition) by the transition judgment, as a table index idx, to the table comparison unit 6.

The table comparison unit 6 inputs not only the table index idx but also a control phase θ and performs a table comparison, then outputs a gate signal g. The table comparison unit 6 outputs the table index previous value idx_z, which is delayed by one control period through a buffer 7, to the transition switch SW1. This table index previous value idx_z may be incremented by processing of the table comparison unit 6, and is not necessarily the same as the table index idx.

Here, the table index idx is determined on the basis of a configuration of the table to be used. In the embodiment 1, it is treated as an array having information of a modulation ratio index di for designating a pulse pattern (a table value) of the modulation ratio which is close to the command modulation ratio d and a phase index θi for determining which numbered phase is referred to.

The important things in FIG. 2 are to search for the transition table index idx' on the basis of the command modulation ratio d and to have a mechanism or configuration which does not always use (adopt) the transition table index idx' but switches the transition table index idx' and the table index previous value idx_z, and the configuration is not limited to that of FIG. 2.

For instance, it could be a configuration in which a table comparison based on the transition table index idx' and a table comparison based on the table index previous value idx_z are performed in parallel, and two types of gate signals are input to the transition switch SW1, then switching to use (adopt) either one of these two gate signals by a transition judgment is performed.

Figure 3:
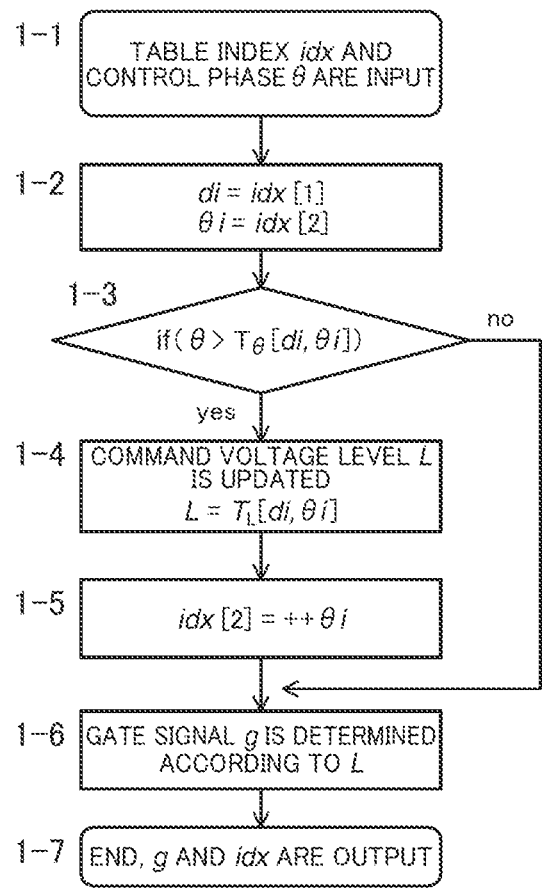
FIG. 3 is a flow chart showing processing of a table comparison unit according to the embodiment 1.

FIG. 3 illustrates a flow chart of the table comparison unit 6 according to the embodiment 1. An object of the present embodiment 1 is a transition method of the pulse pattern, i.e. a transition method of the table, not a method of the table comparison. In view of this, FIG. 3 briefly describes the table comparison method. Here, di is the modulation ratio index, θi is the phase index, $T_θ$ is a table having phase information, and $T_L$ is a table having command voltage level information.

FIG. 3 is only an example of the table comparison method. A different configuration is possible as long as its configuration is such that the control phase is compared with the table value using input index, and the gate signal is determined so as to have an output voltage according to the pulse pattern of the table. That is, a concept of the table configuration, a comparison branching condition with the table value and an updating method of the command voltage level or the gate signal are not limited to FIG. 3.

The control intended in the embodiment 1 can be used in table comparison methods and table configurations of a variety of fixed pulse pattern methods. However, since there is a difference in detailed operation, for explaining working and operation, it is assumed that the following table is used. Here, regarding an expression of the following "level change", since a voltage level changes due to switching of the power converter, the "level change" may be interpreted as "switching", but in the embodiment 1, notation of the "level change" is mainly used.

As the table, the table $T_θ$ having the phase information in which the level changes and the table $T_L$ having the command voltage level information after the level change are prepared. Each row of the two tables $T_θ$ and $T_L$ has information on one pulse pattern. A difference of the row indicates a difference of the modulation ratio of the pulse pattern. Each column of the both tables indicates information about each level change.

Figure 4:
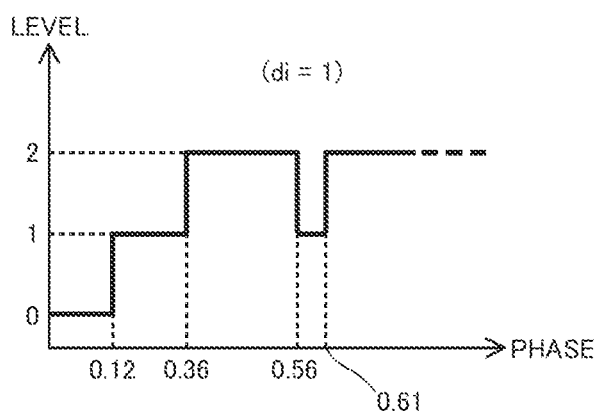
FIG. 4 is a time chart showing an example of a pulse pattern.

For instance, a pulse pattern of FIG. 4 is represented by tables of Table 1. The modulation ratio index di of FIG. 4 is 1. Regarding di=1 of the table in Table 1, the command voltage level information of the table $T_L$ at the same position as the phase information of each level change of the table $T_θ$ is a value after the level change in its level change.

TABLE 1

| | $T_θ$ | | | | |
|---|---|---|---|---|---|
| di = 1 | 0.12 | 0.36 | 0.56 | 0.61 | ... |
| di = 2 | 0.11 | 0.40 | 0.55 | 0.62 | ... |

TABLE 1-continued

| | | | | | |
|---|---|---|---|---|---|
| di = 3 | 0.30 | 0.33 | 0.59 | 0.80 | ... |
| . | ... | | | | |
| . | | | | | |
| . | | | | | |
| | | | $T_L$ | | |
| di = 1 | 1 | 2 | 1 | 2 | ... |
| di = 2 | 1 | 2 | 1 | 2 | ... |
| di = 3 | 1 | 2 | 3 | 2 | ... |
| . | ... | | | | |
| . | | | | | |
| . | | | | | |

Also regarding the table comparison method by which the gate signal is determined by comparing the phase information of $T_\theta$ and the control phase $\theta$, for explaining working and operation, it is assumed that the table comparison method is based on the flow chart of FIG. 3. Operation of the flow chart of FIG. 3 will be described.

At 1-1, the table index idx and the control phase $\theta$ are input. At 1-2, the table value (the modulation ratio index di=idx[1], the phase index $\theta i$=idx[2]) is read.

At 1-3, the control phase $\theta$ is compared with the phase information of the table $T_\theta$[di, $\theta i$]. If the control phase $\theta$ is greater than the phase information of the table $T_\theta$[di, $\theta i$], the routine proceeds to 1-4. If the control phase $\theta$ is equal to or less than the phase information of the table $T_\theta$[di, $\theta i$], the routine proceeds to 1-6.

At 1-4, a command voltage level L is updated to the command voltage level information of the table $T_L$ (L=$T_L$[di, $\theta i$]). Then, at 1-5, reference positions of the tables $T_\theta$ and $T_L$ are each shifted by one (idx[2]=++$\theta i$). That is, if the control phase $\theta$ is greater than a phase value of the table $T_\theta$[di, $\theta i$], the command voltage level L is updated, whereas if the control phase $\theta$ is equal to or less than the phase information of the table $T_\theta$[di, $\theta i$], the previous value remains unchanged.

At 1-6, the gate signal g is determined so as to have the same output voltage level as the command voltage level L. At 1-7, the gate signal g and the table index idx are output, and processing in this control period is ended.

With this processing, the pulse pattern based on the table value can be output. It is noted that this operation is performed for each phase existing in the system.

Figure 5:
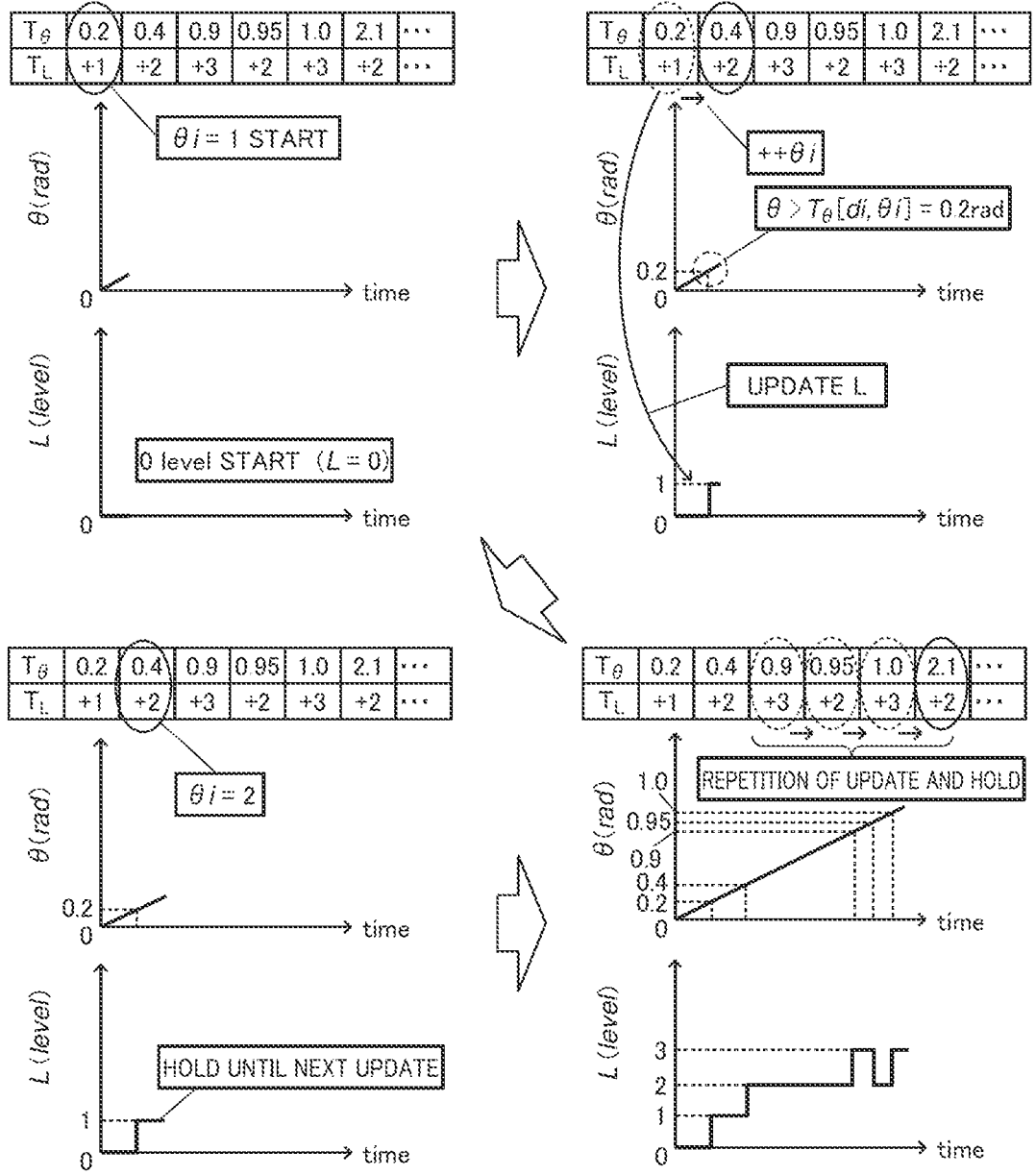
FIG. 5 is an explanatory drawing showing operation of the table comparison unit according to the embodiment 1.

FIG. 5 illustrates table comparison operation. Here, the table $T_\theta$ and the table $T_L$ with the same modulation ratio index di are shown with these tables arranged in two rows.

An upper left of FIG. 5 illustrates initial values. The control phase $\theta$ and the command voltage level L each start from 0, and the phase index $\theta i$ starts from 1. An upper right of FIG. 5 is a first update. A value of a first column of the table $T_\theta$ is 0.2 rad, and when the control phase $\theta$ has exceeded 0.2 rad, the command voltage level L is updated, then the level change is performed. The phase index $\theta i$ is also incremented in order to shift the reference position.

A lower left of FIG. 5 is a state between the first update and next update. The command voltage level L is held. A lower right of FIG. 5 illustrates repetition of the above operation. When seeing the command voltage level L, a pulse pattern designed by the table is output. The above is the table configuration and the table comparison method according to the embodiment 1.

On the basis of the above described table configuration and the table comparison method, the pulse pattern transition method is considered. An objective when performing the pulse pattern transition is to avoid a current impulse (current impact or shock).

Causes causing the current impulse are the following two.

(A) In a phase at the time of the transition, a phase index $\theta i$ that is referred to for a pre-transition pulse pattern and a phase index $\theta i$ that is referred to for a post-transition pulse pattern are different.

(B) In a phase at the time of the transition, a command voltage level L of a pre-transition pulse pattern and a command voltage level L of a post-transition pulse pattern are different.

(A) is a problem of the table reference position. The table of the pulse pattern is arranged in order of level change, and in a case of pulse patterns of different command modulation ratios d, there may arise a situation in which although their control phases $\theta$ are the same, a different table position is referred to. If, as a table reference position, a table reference position before the transition is inherited and used at the time of the transition, there is a risk that the level change in the pulse pattern after the transition will be skipped. That is, an unintended pulse pattern is generated, then the current impulse occurs.

Figure 6:
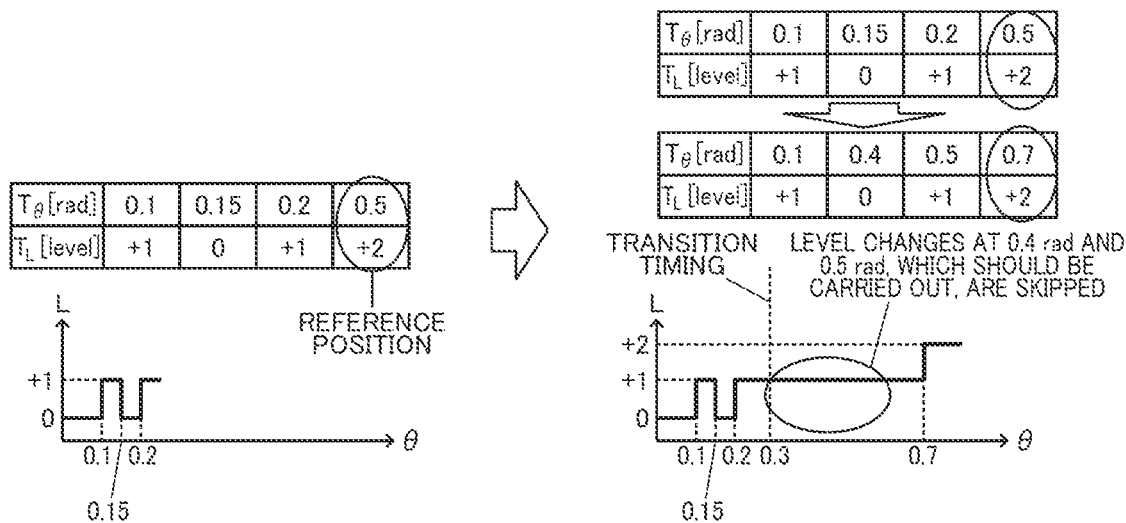
FIG. 6 is a drawing showing an example of a pulse pattern transition which causes a problem (A).

FIG. 6 illustrates an example in which the problem (A) occurs. FIG. 6 shows the example in which the table transition is performed at 0.3 rad. In the table before the transition, when the phase has exceeded 0.2 rad, the reference position becomes a fourth column. Then, as can be seen, if the reference position remains in the fourth column when the table is switched at 0.3 rad, the level changes at 0.4 rad and 0.5 rad, which should be carried out after 0.3 rad, are skipped.

(B) is a problem of a pulse pattern shape. Besides the shift of the reference position in the phase at the time of the transition like the problem (A), there is a possibility that a level to be output will be different even if the reference position is not changed before and after the transition when the number of levels used for the pulse pattern is changed. In this case too, when the reference position and the command voltage level are inherited at the time of the transition, an unintended pulse pattern is generated, then the current impulse occurs.

Figure 7:
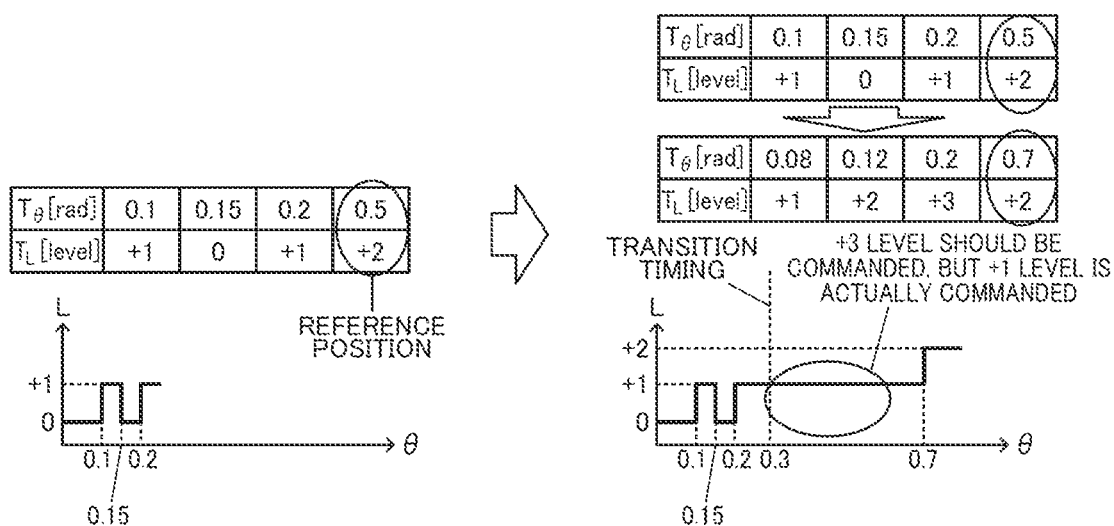
FIG. 7 is a drawing showing an example of a pulse pattern transition which causes a problem (B).

FIG. 7 illustrates an example in which the problem (B) occurs. FIG. 7 shows the example in which the table transition is performed at 0.3 rad. In FIG. 7, a reference position when the table is switched at 0.3 rad is appropriate. However, although +3 level should be commanded as the command voltage level L after the table transition, +1 level is commanded.

In order to solve the problems (A) and (B), the following two are necessary.

(a) A mechanism or configuration for searching for a proper post-table-transition table reference position.

(b) A mechanism or configuration for following the command voltage level L of the post-table-transition pulse pattern.

Figure 8:
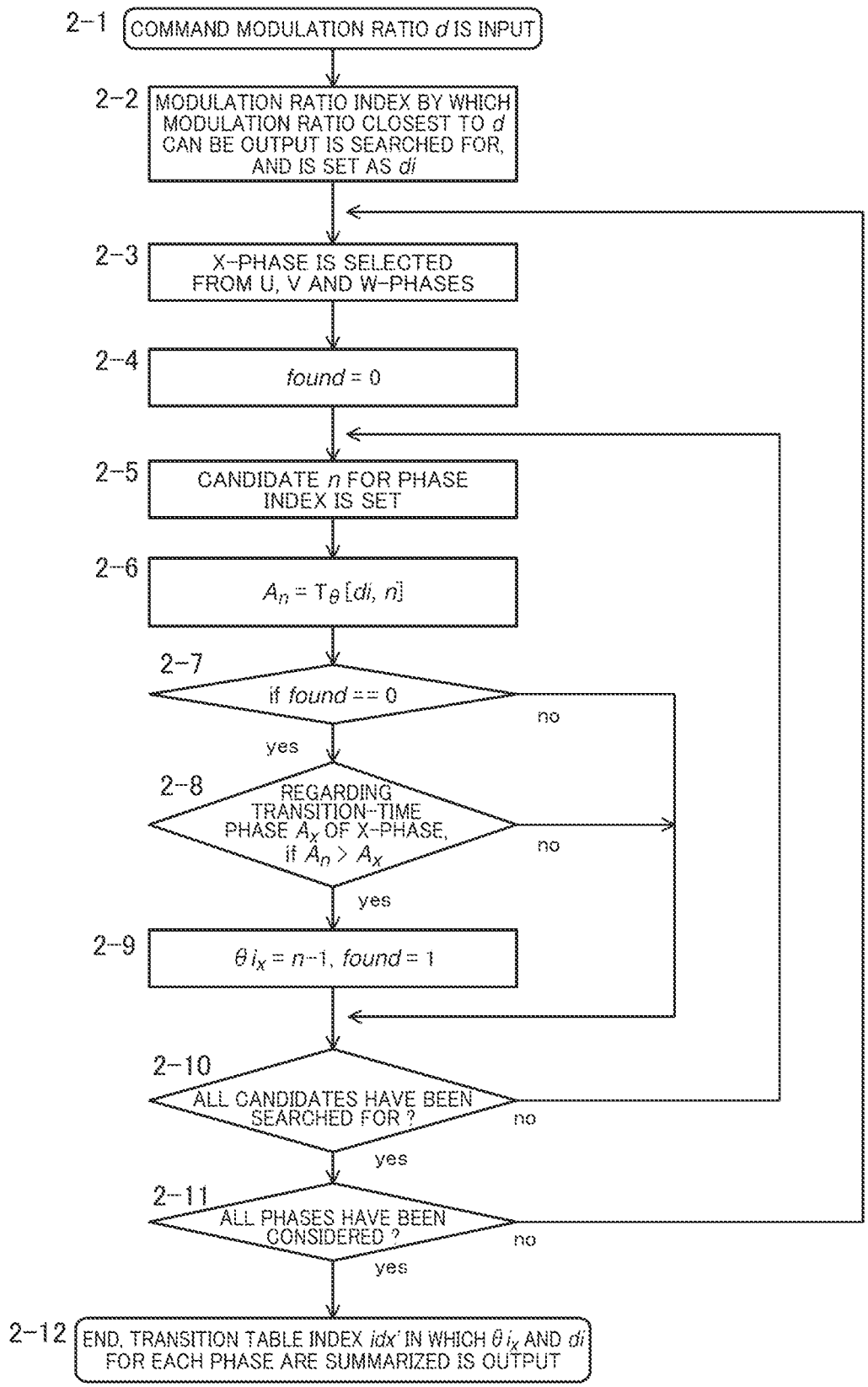
FIG. 8 is a flow chart showing a transition index search unit according to the embodiment 1.

A transition mechanism or configuration based on (a) and (b) is the transition index search unit 5 in FIG. 2, and its operation is shown by a flow chart in FIG. 8.

Here, before the description of FIG. 8, operation of the transition switch SW1 of FIG. 2 will be described. The transition switch SW1 changes an index used or adopted according to the transition judgment. For instance, the transition switch SW1 performs the switching such that if a modulation ratio index di of the transition table index idx' and a modulation ratio index di of the table index previous value idx_z are different, the transition table index idx' is adopted, and in other cases, the table index previous value idx_z is adopted.

Further, when a phase of a certain phase is 0 rad, the switching may be performed at a specific timing. A voltage phase at the switching timing is hereinafter referred to as a transition-time phase (a phase at the time of the transition).

Operation of the flow chart of FIG. 8 will be described. A basic operation is the following.

1. A pulse pattern of a modulation ratio that is closest to the command modulation ratio d is searched for (2-2).
2. A candidate n for the phase index θ1 is set, and phase information $A_n$–$T_\theta$[di, n] of a table of its phase index θi is compared with a transition-time phase $A_x$ (2-5, 2-6, 2-8).
3. If the phase information $A_n$ of the table exceeds the transition-time phase $A_x$, a phase index θix is rewound or set back by one (a phase index θix is made to go back by one), and this is adopted (2-9).
4. After the adoption, a search end flag "found" is set to 1 (found=1), and overwriting of an adoption index is prevented (2-7, 2-9).

By performing the above for all phases existing in the system, the mechanisms or configurations of the above (a) and (b) can be realized.

1. is designation of a proper modulation ratio index di. For this, a modulation ratio index di is determined so as to be able to designate the pulse pattern closest to the command modulation ratio d according to a modulation ratio range in which the tables are prepared, steps or increments of the modulation ratio between the tables and so on.

2. is a branch as to whether or not a table reference position is a proper table reference position. Although the candidate n for the phase index θi is designated in ascending order from among phase information of the table $T_\theta$, it is not necessary to select all the phase information as the candidate. When the transition-time phase $A_x$ can be predicted, by searching for only an index that is a phase in the vicinity of the transition-time phase $A_x$, a repetitive operation amount can be reduced.

A table value to be referred to at the time of the transition is the smallest of table phase information that is greater than the transition-time phase $A_x$. Since the candidate n is designated in ascending order from among the phase information of the table $T_\theta$ as mentioned above, phase information $A_n$ of a table which exceeds the transition-time phase $A_x$ first is adopted. At 2-8, the flow is branched according to whether the phase information $A_n$ of the table exceeds the transition-time phase $A_x$. With this processing of 2., the mechanism or configuration of (a) can be realized.

3. is processing for realizing (b). The problem (B) of selecting an improper command voltage level L after the transition even if the reference position is adjusted is described as above. If the candidate n for the phase index θi is merely adopted as it is, the problem (B) occurs. Therefore, measures are taken.

When adopting the phase index θi, processing to execute rewinding or setting-back so as to adopt a table value that is one smaller is performed (θix=n−1) (2-9). To consider this processing, attention is focused on a table comparison immediately after a post-transition table index idx is adopted.

Since the phase index θi is adopted so that the phase information $A_n$ of the table becomes smaller than the transition-time phase $A_x$, the level change is immediately performed. Since a command voltage level L after this level change is a level to be commanded at the time of the transition in a new pulse pattern, the mechanism or configuration of (b) can be realized. After the level change, by the increment, the index is returned to the index designated at 2.. Therefore, the mechanism or configuration of (a) is not lost.

4. is prevention of improper overwriting. Since the candidate n is designated in ascending order from among the phase information of the table, after the index is adopted once, also in the case of a candidate n for the phase index θi in the next and subsequent loops, phase information $A_n$ of a table becomes greater than the transition-time phase $A_x$. At this time, if measures are not taken, the reference position is overwritten by an improper one. To avoid this, processing is configured so that the search end flag "found" is set to 1 (2-9) at the time of a first adoption, and when the search end flag "found" is 1, the index cannot be adopted (2-7).

It is noted that processing of 2. and 3. can also be realized by designating the candidate n for the phase index θi in descending order from among the phase information of the table $T_\theta$ and adopting a first index by which phase information $A_n$ of a table falls below the transition-time phase $A_x$ without being rewound or set back (without making a first index go back).

Processing of the transition index search unit 5 will be described below with reference of FIG. 8. At 2-1, the command modulation ratio d is input. At 2-2, a modulation ratio index di by which a modulation ratio closest to the command modulation ratio d can be output is searched for. At 2-3, any one of U-phase, V-phase and W-phase is selected as X-phase. At 2-4, the search end flag "found" is set to 0.

At 2-5, a candidate n for the phase index θi is set. At 2-6, phase information of a table of the candidate n is read out, and is set as $A_n$ ($A_n$=$T_\theta$[di, n]). At 2-7, a judgment is made as to whether or not the search end flag "found" is 0. If the search end flag "found" is 0, the routine proceeds to 2-8. If the search end flag "found" is 1, the routine proceeds to 2-10.

At 2-8, a judgment is made as to whether or not the phase information $A_n$ of the table of the candidate n is greater than the transition-time phase $A_x$ of the X-phase. If the phase information $A_n$ of the table of the candidate n is greater than the transition-time phase $A_x$ of the X-phase, the routine proceeds to 2-9. If the phase information $A_n$ of the table of the candidate n is equal to or less than the transition-time phase $A_x$ of the X-phase, the routine proceeds to 2-10.

At 2-9, the phase index is rewound or set back by one (the phase index is made to go back by one), and a table value that is one smaller is adopted (θix=n−1). Also, the search end flag "found" is set to 1. At 2-10, a judgment is made as to whether or not all candidates for the phase index θi have been searched for. If all the candidates for the phase index θi have been searched for, the routine proceeds to 2-11. If all the candidates for the phase index θi have not been searched for, the routine is returned to 2-5. At 2-11, a judgment is made as to whether or not all the phases (the U-phase, the V-phase and the W-phase) have been considered. If all the phases have been considered, the routine proceeds to 2-12. If all the phases have not been considered, the routine is returned to 2-3. At 2-12, a transition table index idx' in which the phase index θix and the modulation ratio index di for each phase are summarized is output.

Figure 9:
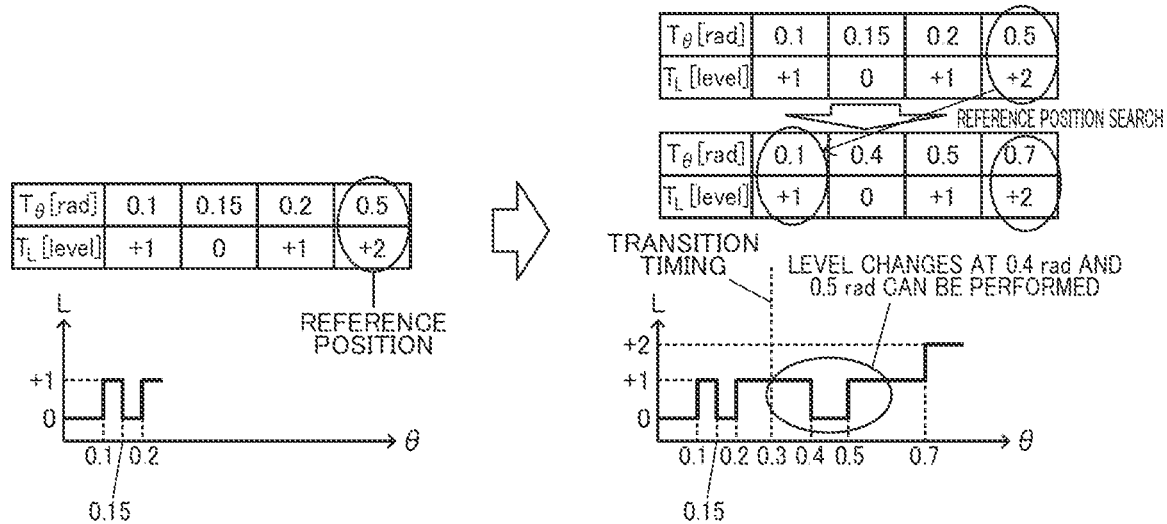
FIG. 9 is a drawing showing an example of a solution to the problem (A) according to the embodiment 1.
Figure 10:
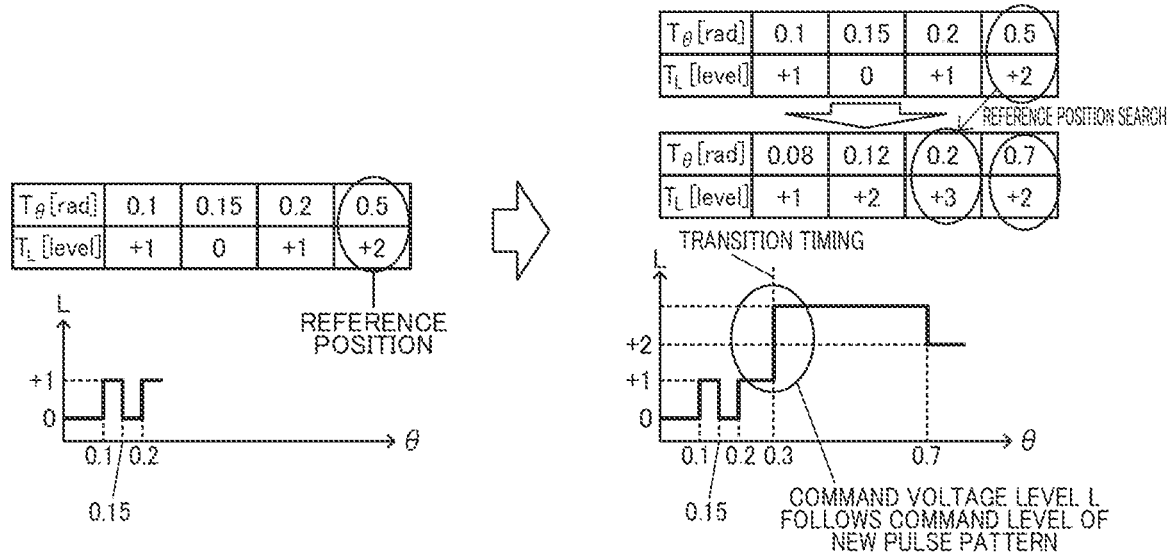
FIG. 10 is a drawing showing an example of a solution to the problem (B) according to the embodiment 1.

FIGS. 9 and 10 illustrate operations when using the present embodiment 1 in FIGS. 6 and 7 respectively. FIG. 9 shows an example in which the table transition is performed at 0.3 rad. In FIG. 9, a reference position moves to 0.1 rad that comes one before phase information 0.4 rad of a table that exceeds the transition-time control phase 0.3 rad. With this, the level changes at 0.4 rad and 0.5 rad, which are lost in FIG. 6, are carried out in FIG. 9.

In FIG. 10, a reference position moves to 0.2 rad that comes one before phase information 0.7 rad of a table that exceeds the transition-time control phase 0.3 rad. With this, although the command voltage level L after the transition is different from that in the new pulse pattern in FIG. 7, the command voltage level L immediately follows that of the new pulse pattern after the transition in FIG. 10.

The above is the description of the operation of the flow chart of FIG. 8. By the flow chart of FIG. 8, the current impulse (the current impact or shock) due to the problems (A) and (B) can be solved. Therefore, in the embodiment 1, by performing the control of FIG. 2 in the system of FIG. 1, the pulse pattern transition can be properly performed.

However, important points of the embodiment 1 are to provide the following mechanisms or configurations (a) and (b), which are described again, in order to reduce the current impulse at the time of the transition, and the same mechanisms or configurations can be realized even if the table configuration and the table comparison method are different from those of the embodiment 1.
(a) A mechanism or configuration for searching for a proper post-transition table reference position.
(b) A mechanism or configuration for following the command voltage level of the post-transition pulse pattern.

That is, as long as the mechanisms or configurations (a) and (b) are provided, detailed processing or operation is not limited to FIG. 3 and FIG. 8.

As described above, according to the embodiment 1, by designating the proper transition-time table reference position and making the command voltage level follow the command voltage level of the post-transition pulse pattern on the basis of FIGS. 2 and 8, the control that achieves the pulse pattern transition without the current impulse (the current impact or shock) can be performed.

Further, the present embodiment 1 has an advantage of being able to be applied to the multi-level power converter having four levels or more over Patent Documents 1 and 2.

Embodiment 2

Figure 11:
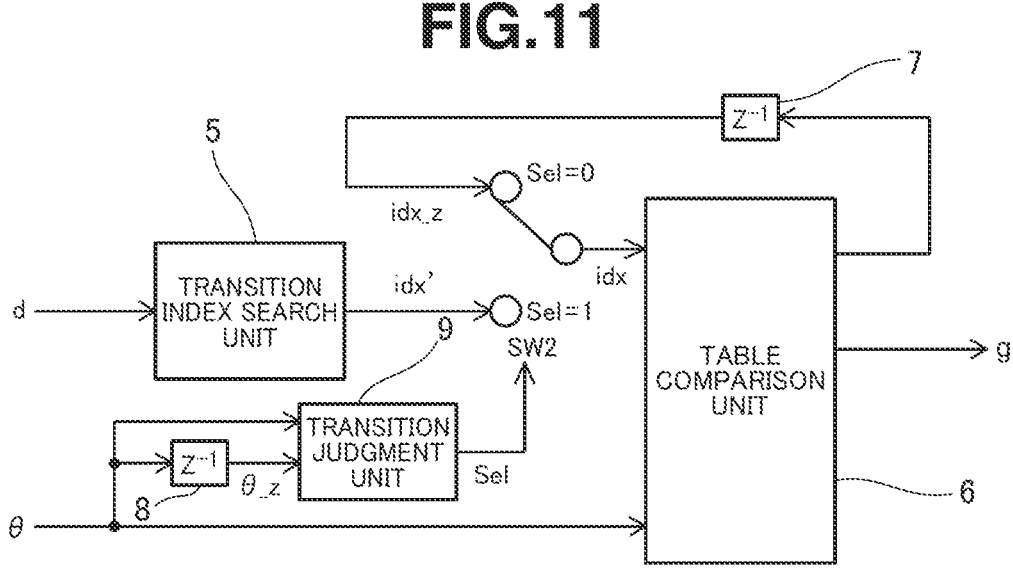
FIG. 11 is a block diagram showing a fixed pulse pattern modulation unit according to the embodiment 2.

FIG. 11 illustrates a block diagram of a fixed pulse pattern modulation unit 2 according to an embodiment 2. A transition index search unit 5 inputs a command modulation ratio d, and outputs a transition table index idx'.

A transition switch SW2 inputs the transition table index idx' and a table index previous value idx_z that is a previous output of a table comparison unit 6, and outputs, as a table index idx, either one of them by a transition judgment result Sel to the table comparison unit 6.

A transition judgment unit 9 outputs the transition judgment result Sel on the basis of a control phase θ and a control phase previous value θ_z which is delayed by one control period through a buffer 8. The table comparison unit 6 performs a table comparison on the basis of the control phase θ and the table index idx, and outputs a gate signal g. Although the table comparison unit 6 outputs the table index previous value idx_z, which is delayed by one control period through a buffer 7, to the transition switch SW2, this may be incremented by processing of the table comparison unit 6, and is not necessarily the same as the input table index idx.

Like FIG. 2 of the embodiment 1, a configuration of FIG. 11 is not limited as long as the configuration has a mechanism or configuration which does not always use (adopt) the transition table index idx' but switches the transition table index idx' and the table index previous value idx_z.

Figure 12:
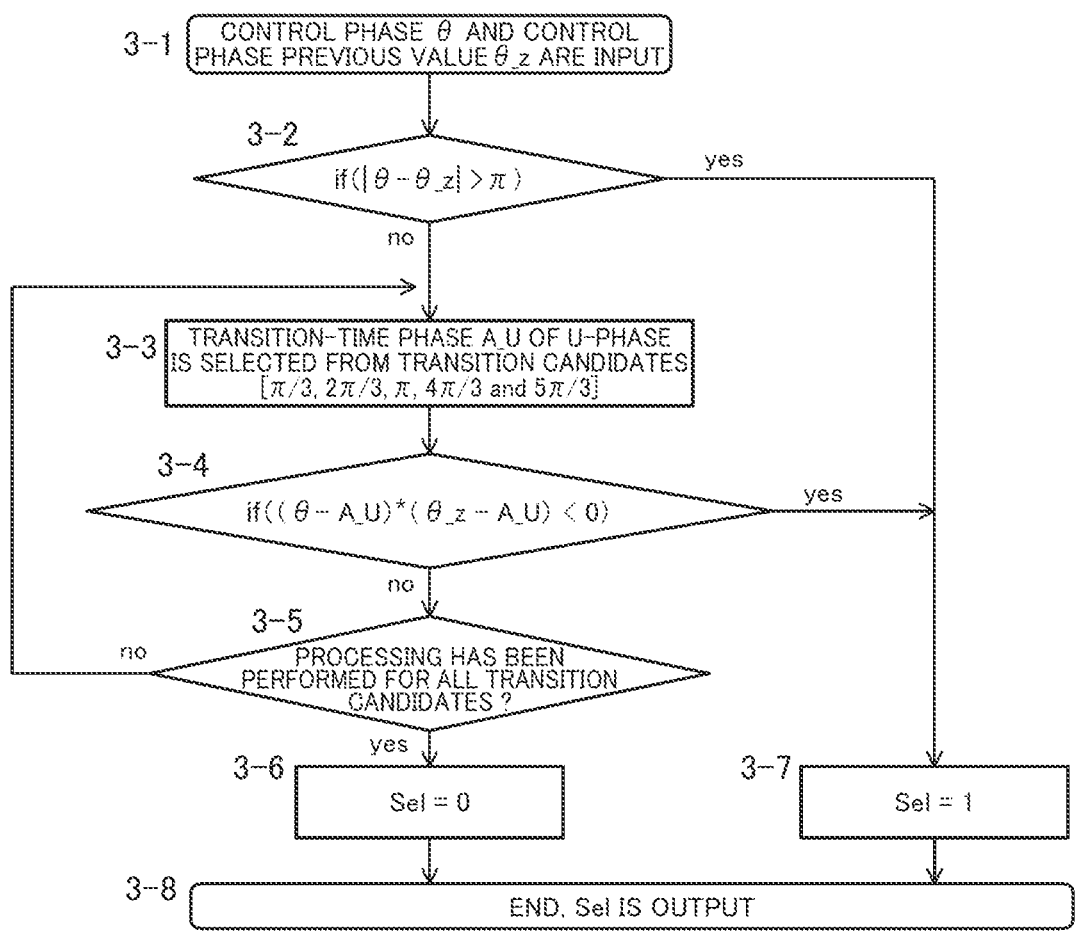
FIG. 12 is a flow chart showing processing of a transition judgment unit according to the embodiment 2.

FIG. 12 illustrates a flow chart of the transition judgment unit 9 according to the embodiment 2. In the present embodiment 2, a transition judgment method according to pulse pattern design is considered for the transition judgment.

In the embodiment 1, as the causes of the current impulse, (A) and (B) are raised. In the present embodiment 2, the following is further added.
(C) A pre-transition pulse pattern and a post-transition pulse pattern are different in voltage harmonic components of the order of multiples of 3.

(C) is a problem of a pulse pattern design method. In a three-phase system, harmonic components of the order of multiples of 3 of an output voltage do not appear as a current harmonic. For this reason, the pulse pattern could be designed with the voltage harmonics of the order of multiples of 3 being allowed. At this time, since magnitude of the voltage harmonic components of the order of multiples of 3 in each pulse pattern is different, if the transition is carried out without considering it, the current impulse tends to occur.

Figure 13:
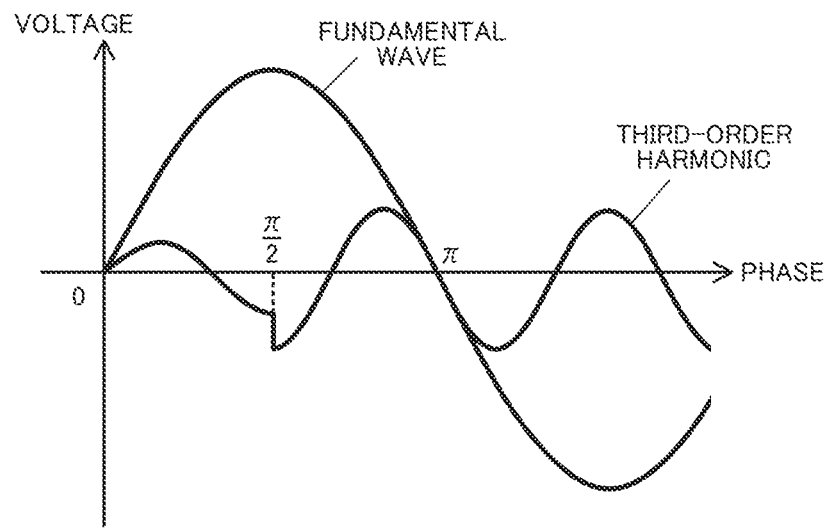
FIG. 13 is an explanatory drawing showing variation of a third-order harmonic in a case where transition is performed at $\pi/2$.

FIG. 13 illustrates variation of a third-order harmonic in a case where the transition is performed at $\pi/2$. $\pi/2$ is a phase in which the third-order harmonic has a peak. If the transition is performed in this phase, variation of the voltage component is large, and the current impulse tends to occur.

In view of FIG. 13, a phase in which the third-order harmonic does not greatly change at the instant of the transition is considered. A zero-crossing phase of the third-order harmonic (a phase in which the third-order harmonic crosses 0) is the same regardless of an amplitude value of the third-order harmonic. Therefore, it is conceivable that if the transition is performed in the zero-crossing phase of the third-order harmonic, sudden variation or fluctuation of the waveform is small.

Figure 14:
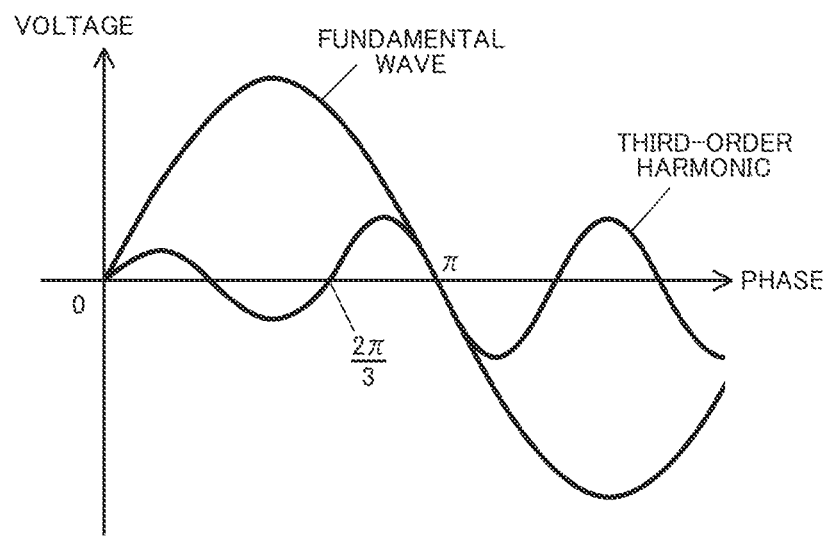
FIG. 14 is an explanatory drawing showing variation of the third-order harmonic in a case where the transition is performed at $2\pi/3$.

FIG. 14 illustrates variation of the third-order harmonic in a case where the transition is performed at $2\pi/3$. At $2\pi/3$, the amplitudes of the third-order harmonic before and after the transition are both 0, and the sudden variation or fluctuation of the third-order harmonic does not occur.

In this way, if the transition judgment is performed so that the transition table index idx' is adopted in the zero-crossing phases of the third-order harmonic, i.e. in the vicinity of 0 rad, $\pi/3$ rad, $2\pi/3$ rad, $\pi$ rad, $4\pi/3$ rad and $5\pi/3$ rad, the current impulse caused by (C) can be prevented.

Although a subject of (C) is all of the order of multiples of 3, since the zero-crossing phases of the third-order harmonic are zero-crossing phases of all the voltage harmonics of the order of multiples of 3, a problem with the harmonics of the order of multiples of 3 which is greater 3 does not occur.

Operation to realize the above is considered. As shown in FIG. 11, the control phase θ and the control phase previous value θ_z are input to the transition judgment unit 9. In the transition judgment unit 9, processing based on the flow chart of FIG. 12 is performed, and the transition judgment result Sel is output. The transition judgment result Sel is input to the transition switch SW2. If Sel is 0 (Sel=0), the table index previous value idx_z is adopted. If Sel is 1 (Sel=1), the transition table index idx' is adopted. That is, if Sel is 1 (Sel=1), transition processing is performed, whereas if Sel is 0 (Sel=0), no transition occurs.

Next, operation of FIG. 12 will be described. In FIG. 12, operation is performed so that Sel is set to 1 (Sel=1) only for a period exceeding 0 rad, $\pi/3$ rad, $2\pi/3$ rad, $\pi$ rad, $4\pi/3$ rad and $5\pi/3$ rad.

At 3-1, the control phase θ and the control phase previous value θ_z are input. As a prerequisite, the control phase θ changes in a range of $0<\theta<2\pi$. At 3-2, a judgment is made as to whether or not an absolute value of a difference between the control phase θ and the control phase previous value θ_z is greater than π rad. This judgment detects that the control phase θ changes from the vicinity of 0 rad to the vicinity of 2π rad or in its opposite direction. Normally, when θ is integrated, the increase and decrease of π rad or more do not occur in one control period. Therefore, if the difference is π rad or more, this is considered as exceeding 0 rad or 2π rad, and the transition is performed. If yes at 3-2, the routine proceeds to 3-7, and Sel is set to 1 (Sel=1).

If No at 3-2, the routine proceeds to 3-3. At 3-3, assuming that the control phase θ is a reference of a phase of U-phase, a transition candidate A_U is selected from π/3 rad, 2π/3 rad, π rad, 4π/3 rad and 5π/3 rad except 0 rad.

Subsequently, at 3-4, the flow is branched according to whether a magnitude relationship between the transition candidate A_U and the control phase θ changes from the control phase previous value θ_z. At 3-4, a judgment is made as to whether or not (θ−A_U)*(θ_z−A_U) is smaller than 0. If (θ−A_U)*(θ_z−A_U) is smaller than 0, the routine proceeds to 3-7. If (θ−A_U)*(θ_z−A_U) is equal to or greater than 0, the routine proceeds to 3-5. That is, calculation result is negative, since the transition candidate A_U is straddled by the control phase θ this time and the control phase previous value θ_z, the judgment is Yes, and the routine proceeds to 3-7, then Sel is set to 1 (Sel=1).

At 3-5, a judgment is made as to whether or not processing has been performed for all the transition candidates. If No at 3-4 for all the transition candidates, no transition is performed, then the routine proceeds to 3-6, and Sel is set to 0 (Sel=0). After the transition judgment result Sel is fixed at 3-6 and 3-7, this result as an output is input to the transition switch SW2 of FIG. 11. The above is the operation of the flow chart of FIG. 12.

Although the flow chart of the transition index search unit 5 in FIG. 8 is not changed, from the phase of the transition judgment, the transition-time phase $A_x$ is inevitably limited to any one of 0 rad, π/3 rad, 2π/3 rad, π rad, 4π/3 rad and 5π/3 rad. The above is the operation method of the present embodiment 2.

Although only single-phase operation has been discussed, in the three-phase system, the zero-crossing phases of the third-order harmonic are also zero-crossing phases of the third-order harmonic in other phases. Even if other phases are taken into consideration, the number of phases in which the transition can be performed is not increased or decreased.

Therefore, in the embodiment 2, by performing the control of FIG. 11 and also setting the phase of the transition judgment to 0 rad, π/3 rad, 2π/3 rad, π rad, 4π/3 rad or 5π/3 rad, a proper pulse pattern transition when the voltage harmonics of the order of multiples of 3 vary or fluctuate in each pulse pattern can be performed.

As described above, according to the embodiment 2, by designating the proper transition-time table reference position, making the command voltage level follow the command voltage level of the post-transition pulse pattern and limiting transition timing to each vicinity of 0 rad, π/3 rad, 2π/3 rad, π rad, 4π/3 rad and 5π/3 rad on the basis of FIGS. 8, 11 and 12, the control that achieves the pulse pattern transition without the current impulse (the current impact or shock) and that can meet the pulse pattern design in which the voltage harmonics of the order of multiples of 3 vary or fluctuate in each pulse pattern can be performed.

Further, the present embodiment 2 has advantages of being able to be applied to the multi-level power converter having four levels or more and of taking the variation or fluctuation of the voltage harmonics of the order of multiples of 3 in each pulse pattern into consideration over Patent Documents 1 and 2.

Although the present invention has been described in detail only for the above embodiments, it is obvious to those skilled in the art that various modifications and corrections can be made within the scope of the technical idea of the present invention. As a matter of course, such modifications and corrections belong to the scope of the claim.

The invention claimed is:

1. A power conversion system comprising:
a fixed pulse pattern modulation unit configured to refer to tables storing therein pulse patterns that determine respective command voltage levels corresponding to phase information for each modulation ratio and to generate a gate signal on the basis of a command modulation ratio and a control phase, wherein the power conversion system drives a power converter on the basis of the gate signal, wherein
the fixed pulse pattern modulation unit has:
  a transition index search unit configured to output a transition table index on the basis of the command modulation ratio;
  a transition switch configured to input the transition table index and a table index previous value and output, as a table index, the transition table index in a case of presence of the transition and the table index previous value in a case of absence of the transition;
  a table comparison unit configured to perform a table comparison on the basis of the table index and the control phase and output the gate signal; and
  a buffer configured to delay the table index by one control period and output the delayed table index as the table index previous value, and
the fixed pulse pattern modulation unit is further configured to, when performing a pulse pattern transition, search for a proper post-transition table reference position and make a command voltage level follow a command voltage level of a post-transition pulse pattern.

2. The power conversion system as claimed in claim 1, wherein
the table comparison unit has, as the tables, phase information in which a level changes for each modulation ratio and command voltage level information after the level change, and
the table comparison unit is configured to
  read a table value on the basis of the table index,
  compare the control phase and the phase information of the table,
  if the control phase is greater than the phase information of the table, update the command voltage level and increment a reference position of the phase information of the table by one,
  if the control phase is equal to or less than the phase information of the table, hold the command voltage level and the reference position of the phase information of the table as previous values,
  generate the gate signal so as to have a same output voltage level as the command voltage level, and
  output the gate signal and the table index.

3. The power conversion system as claimed in claim 1, wherein
the transition index search unit is configured to
  search for the pulse pattern of a modulation ratio closest to the command modulation ratio and set this modulation ratio as a modulation ratio index,
  for each phase of the power converter, set, as a phase index, phase information that is one smaller than a smallest of the phase information of the table which is greater than a transition-time phase, and output the transition table index in which the modulation ratio index and the phase index of each phase of the power converter are summarized.

4. The power conversion system as claimed in claim 1, wherein the power converter is a multi-level power converter having four levels or more.

5. A power conversion system comprising:

a fixed pulse pattern modulation unit configured to refer to tables storing therein pulse patterns that determine respective command voltage levels corresponding to phase information for each modulation ratio and to generate a gate signal on the basis of a command modulation ratio and a control phase, wherein the power conversion system drives a power converter on the basis of the gate signal, wherein the fixed pulse pattern modulation unit has:

a transition index search unit configured to output a transition table index on the basis of the command modulation ratio;

a transition judgment unit configured to output a transition judgment result on the basis of the control phase and a control phase previous value;

a transition switch configured to input the transition table index and a table index previous value and output, as a table index, the transition table index in a case of presence of the transition by the transition judgment result and the table index previous value in a case of absence of the transition by the transition judgment result;

a table comparison unit configured to perform a table comparison on the basis of the table index and the control phase and output the gate signal; and a buffer configured to delay the table index by one control period and output the delayed table index as the table index previous value, transition timing of the pulse pattern is each vicinity of 0 rad, π/3 rad, 2π/3 rad, π rad, 4π/3 rad and 5π/3 rad of the control phase, and the fixed pulse pattern modulation unit is further configured to, when performing a pulse pattern transition, search for a proper post-transition table reference position and make a command voltage level follow a command voltage level of a post-transition pulse pattern.

6. The power conversion system as claimed in claim 5, wherein the table comparison unit has, as the tables, phase information in which a level changes for each modulation ratio and command voltage level information after the level change, and the table comparison unit is configured to read a table value on the basis of the table index, compare the control phase and the phase information of the table, if the control phase is greater than the phase information of the table, update the command voltage level and increment a reference position of the phase information of the table by one, if the control phase is equal to or less than the phase information of the table, hold the command voltage level and the reference position of the phase information of the table as previous values, generate the gate signal so as to have a same output voltage level as the command voltage level, and output the gate signal and the table index.

7. The power conversion system as claimed in claim 5, wherein the transition index search unit is configured to search for the pulse pattern of a modulation ratio closest to the command modulation ratio and set this modulation ratio as a modulation ratio index, for each phase of the power converter, set, as a phase index, phase information that is one smaller than a smallest of the phase information of the table which is greater than a transition-time phase, and output the transition table index in which the modulation ratio index and the phase index of each phase of the power converter are summarized.

8. The power conversion system as claimed in claim 5, wherein the transition judgment unit is configured to judge whether an absolute value of a difference between the control phase and the control phase previous value is greater than π rad, if the absolute value of the difference is greater than π rad, set the transition judgment result as presence of the transition, if the absolute value of the difference is equal to or less than π rad, select a transition candidate for a transition-time phase of a certain phase from π/3 rad, 2π/3 rad, π rad, 4π/3 rad and 5π/3, judge whether (the control phase–the transition candidate)*(the control phase previous value–the transition candidate) is smaller than 0, if (the control phase–the transition candidate)*(the control phase previous value–the transition candidate) is smaller than 0 in any one of the transition candidates, set the transition judgment result as presence of the transition, if (the control phase–the transition candidate)*(the control phase previous value–the transition candidate) is equal to or greater than 0 in all the transition candidates, set the transition judgment result as absence of the transition.

9. The power conversion system as claimed in claim 5, wherein the power converter is a multi-level power converter having four levels or more.

\* \* \* \* \*